United States Patent Office 3,327,677
Patented June 27, 1967

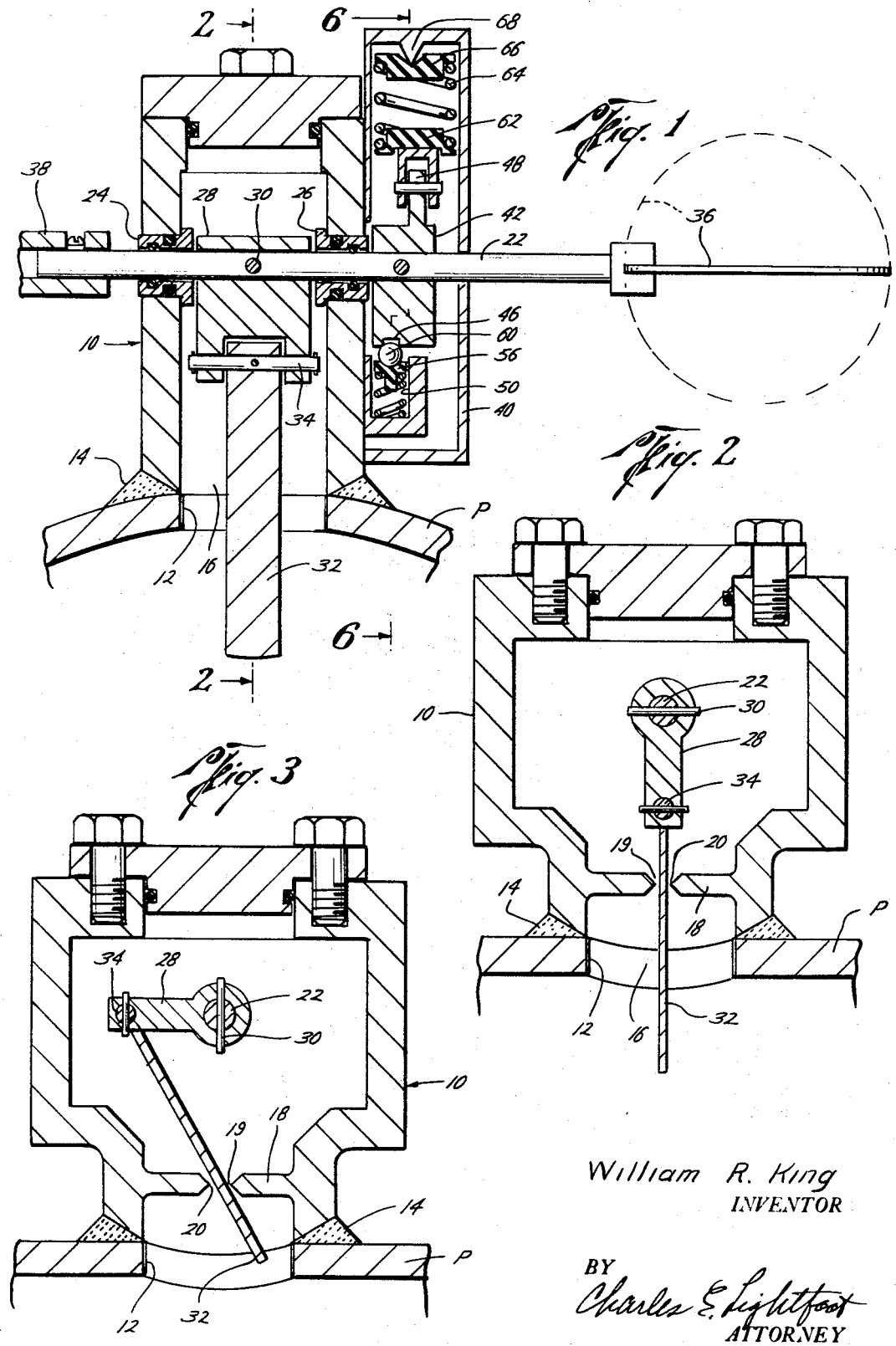

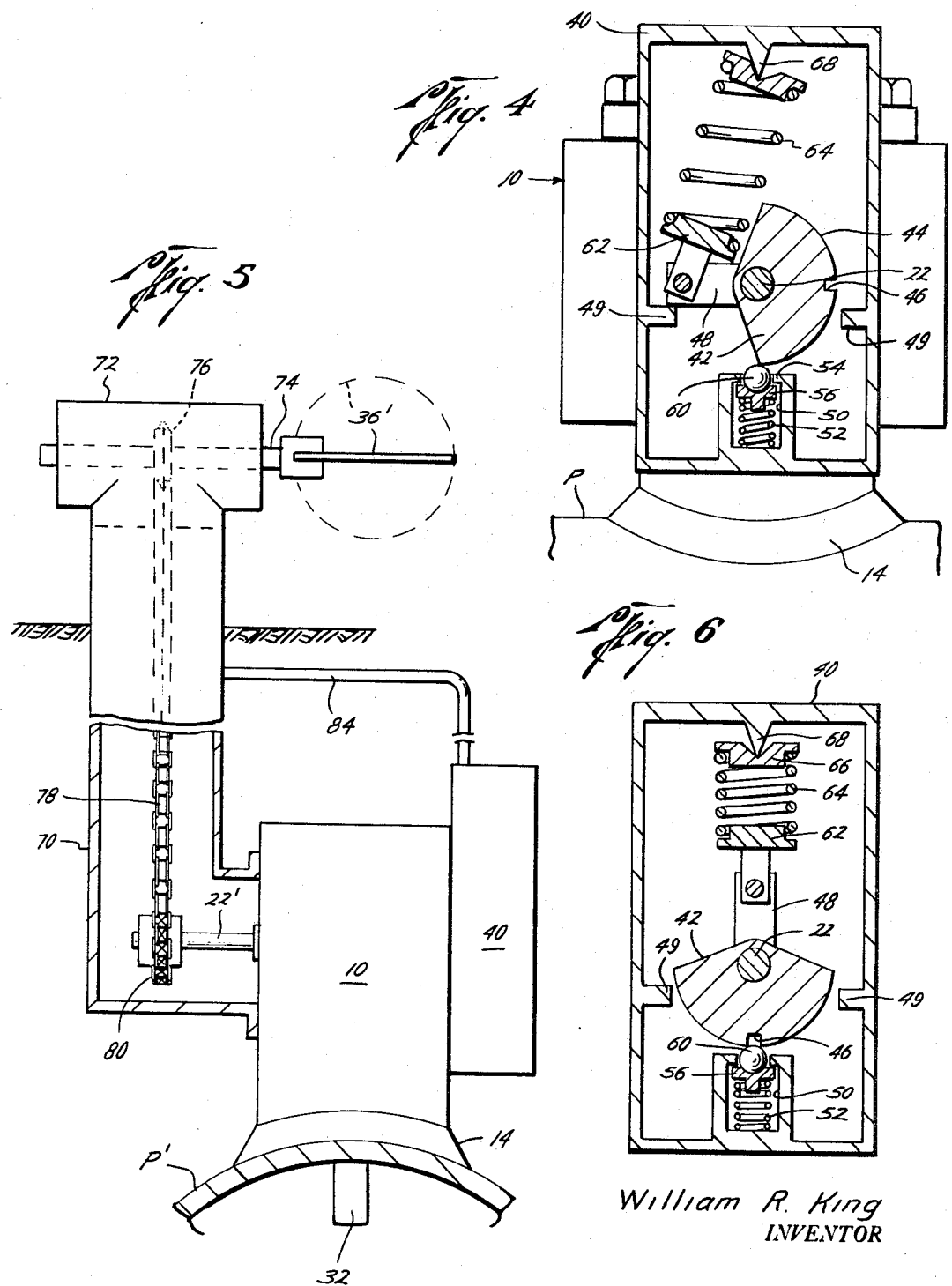

3,327,677
PIPELINE PIG SIGNALLING DEVICE
William R. King, P.O. Box 2269,
Longview, Tex. 75601
Filed June 16, 1966, Ser. No. 558,017
8 Claims. (Cl. 116—124)

ABSTRACT OF THE DISCLOSURE

A device for use on a pipeline for signalling the arrival of a pipeline pig passing along the line.

---

This invention relates to a device for registering or signalling the arrival of a pipeline pig when the same reaches a predetermined location in the line.

In the operation of pipelines, it is customary to insert a plug or pig in the line which then moves through the pipe under a pressure differential produced by the flow of fluid therein. By this means various operations may be carried out, such as cleaning out the pipeline or changing the character of the material which is transported thereby.

In carrying out operations of this kind there is usually no way of determining the precise location of the pig in the line at any particular time, so that there is no way of knowing when the flow should be diverted or stopped at the station where a change is to be made or at which the pig is to be removed.

The present invention has for an important object the provision of mechanism for application to a pipeline which is designed for actuation by a pig to indicate or detect the arrival of the pig at a predetermined location in the line.

Another object of the invention is to provide a device for signalling the arrival of a pig in a pipeline which does not interfere with the free passage of the pig therethrough.

A further object of the invention is the provision in a pipeline pig detector of an actuating element adapted to be extended into the pipe for engagement by the pig passing therethrough to actuate the detector and which moves to a position out of the flowway of the line upon such actuation.

Another object of the invention is to provide pipeline pig detector mechanism which is readily adapted to give a signal at a location in a pipeline upon the arrival of a pig at such location or to indicate such arrival at some point remote from such location.

Another object of the invention is the provision in pipeline pig detector mechanism of the kind referred to of a source of stored energy and means operable by a a pipeline pig upon arrival of the pig at a predetermined location to release such energy to actuate a signal.

A still further object of the invention is to provide a pipeline pig detector or indicator which is of simple design and rugged construction, which may be easily applied to a pipeline and which does not present any obstruction to the free passage of the pig through the line.

The above and other obvious advantages of the invention will be apparent from the following detailed description, constituting a specification of the invention, reference being had to the annexed drawings illustrating a preferred embodiment of the same.

In the drawings:

FIGURE 1 is a front elevational view, partly broken away and partly in cross section, illustrating a preferred embodiment of the invention and showing the same applied to a pipeline;

FIGURE 2 is a fragmentary, vertical, central, cross-sectional view of a lower portion of the pig detector, as illustrated in FIGURE 1, showing details of structure of the actuating mechanism, with the actuator element in its extended position ready to be actuated by a pig passing through the line;

FIGURE 3 is a cross-sectional view taken along the line 2—2 of FIGURE 1, looking in the direction indicated by the arrows;

FIGURE 4 is a view similar to that of FIGURE 3 showing the actuator element in its retracted position;

FIGURE 5 is a cross-sectional view, taken along the line 5—5 of FIGURE 2, looking in the direction indicated by the arrows; and FIGURE 6 is a fragmentary view similar to that of FIGURE 4, showing the mechanism in set position with the energy storing means in condition to release energy for actuation of the signal upon triggering of the mechanism by the arrival of a pipeline pig.

Briefly described the invention comprises signalling or indicating mechanism adapted to be connected into a pipeline and including an actuating element which is mounted to be extended into the flowway in position for engagement with a pig passing through the line to actuate the element whereby the mechanism is operated to give a signal indicating the arrival of the pig. The mechanism of the invention also includes means for holding the actuating element in a retracted position when the mechanism has been operated to give a signal and which may be operated to reset the actuating element in position to again operate the mechanism upon the arrival of another pig.

Referring to the drawings in greater detail, the detector or signalling mechanism of the invention includes a hollow casing, generally designated 10, having an opening 12 at its lower end, and which is adapted to be secured to a section of pipe P of a pipeline, as by means of welding, indicated at 14, with the opening 12 in registration with an opening 16 in the pipe.

Withing the casing 10, somewhat inwardly of its lower end, a transversely extending partition 18 is disposed, which has a central opening 19 whose periphery is bevelled to form an annular edge portion 20 about the opening. A shaft 22 extends horizontally through the casing above the partition 18 which shaft is rotatably mounted in suitable bearings, such as those indicated at 24 and 26 in the opposite side walls of the casing, as seen in FIGURE 1. The shaft 22 carries an arm 28, extending radially therefrom within the casing and which is secured to the shaft for rotation therewith, as by means of a pin 30.

An actuating element or lever 32 is pivotally attached at its upper end to the outer end of the arm 28, as by means of a pin 34 and extends downwardly therefrom through the opening 19 in which the element is freely slidable. By this arrangement it will be apparent that the element 32 will be extended into the flowway of the pipe P when the arm 28 is in a downwardly extending position, as shown in FIGURE 2, in which position the shaft 22 will be in one position of rotation, and when the lower end of the element 32 is engaged by a pig passing through the pipe, to initiate rocking movement of the element about the edge 20 to actuate the arm 28 to rotate the shaft 22 to another position, as shown in FIGURE 3. Moreover, as the element 32 rocks on the edge 20 the arm 28 will cause the element to move inwardly to a retracted position out of the flowway within the lower end of the casing as shown in FIGURE 3.

The shaft 22 may conveniently be extended outwardly beyond the opposite sides of the casing for the attachment thereto of suitable indicator means, such as the target type signal member 36 at one end of the shaft or for the operation of suitable means, such as an electric switch, or the like, not shown, which may be connected to the other end of the shaft for operation thereby, as by means of a connecting element 38, or the like, shown in FIGURE 1, whereby the arrival of a pig may be indicated at some remote location by the use of electrical circuits or other means.

The mechanism also includes means for yieldingly retaining the actuating element 32 in its extended position prior to the arrival of a pig and in its retracted position after a signal has been given by such arrival, which means is shown in FIGURES 1 and 4 and which comprises a housing 40, suitably attached to one side wall of the casing 10 and through which the shaft 22 is rotatably extended. Within the housing the shaft 22 carries a detent element 42 rotatable with the shaft and which has an arcuate face 44 formed with a radially outwardly opening notch 46 located substantially midway of its length, and an arm 48 extending radially opposite said notch.

The housing 40 is provided interiorly with a spring pocket or recess 50 within which a coil spring 52 is seated, the pocket being formed at its open end with inwardly extending projections 54 positioned to be engaged by a spring plate 56 to retain the spring in the pocket and upon which a ball 58 is positioned in a depression 60 provided theerfor. The ball 60, in this arrangement, is yieldingly urged toward an extended position extending beyond the open end of the pocket 50 for engagement in the notch 46 to yieldingly hold the detent element 42 in a centralized position, as shown in FIGURE 1, with the actuating element extended into the flowway of the pipe for engagement with a pig, so that when the shaft 22 is rotated in either direction by actuation of the element 32 by the arrival of a pig, the ball 60 will ride out of the notch 46.

The arm 48 is pivotally connected at its outer end to a spring plate 62 against which one end of a coil spring 64 bears, whose other end is seated on a rockably mounted spring plate 66 having a central V-shaped groove into which a tapered projection 68 in the top of the housing extends. When the ball 60 is in the notch 46, the spring 64 will be compressed, the axis of the spring being then in alignment with the shaft 22 and projection 68, so that there will then be no force exerted by the spring tending to rotate the shaft. By this arrangement the spring 64 will be compressed, as shown in FIGURE 1, when the ball 60 is in notch 46 and the element 32 is extended, and upon engagement of the element 32 with a pig moving through the pipe P in either direction the shaft 22 will be rotated to turn the detent element 42 which will then be rotated by the spring 64 with a snapping action to turn the shaft 22 quickly to move the element 32 to retracted position and operate the signal. The housing 40 is provided with means, such as the internal projections 49, positioned to be engaged by the arm 48, to limit rotation of the shaft 22 in either direction. When the signal has thus been operated and the actuator element moved out of the way of the passing pig, the element will be held in its retracted position until the shaft 22 is rotated, as by means of the target 36 to reset the mechanism with the element 32 in extended position, in which it will then be held by the ball 60 in the notch 46.

Suitable means, not shown, such as an electrical solenoid, or the like, of course, may be provided for rotating the shaft 22 to reset the signal, whereby the mechanism may be reactivated from some remote location.

A somewhat modified form of the invention is illustrated in FIGURE 5, wherein the mechanism is attached to a pipe line located beneath the ground and means is provided whereby the signal may be seen at a location above ground.

In this form of the invention the casing 40 is attached to the pipe P as previously described, and is provided with a hollow extension 70 attached to one side wall of the casing surrounding the shaft 22 and extending upwardly above the ground. At the upper end of the extension 70 there is a hollow cross-head 72 through which a shaft 74 is rotatably extended, which shaft carries a sprocket 76 inside of the head over which a chain 78 operates which also passes about a sprocket 80 mounted on the shaft 22' in the vertical portion of the extension. The shaft 74 may carry at one end a target signal 36' similar to the target 36, previously described, and the other end of the shaft 74 may be used for the operation of electrical equipment of suitable character by which a signal may be given at a remote location as in the previously described form of the invention. Thus, upon the arrival of a pig in the underground pipe P', the mechanism will be operated to rotate shaft 22' which in turn rotates the shaft 74 to operate the target 36'. The mechanism illustrated in FIGURE 5 may be reset by rotation of the shaft 74, and in other respects is similar to the mechanism illustrated in FIGURES 1 to 4. A pipe 84 may be provided leading into the casing 40 by which the same may be filled with oil to prevent corrosion of the mechanism therein by condensation or other cause.

The mode of operation of the equipment is believed to be obvious from the above description. The mechanism is set in the condition illustrated in FIGURES 2 and 6, with the actuating element 32 extended into the flowway of the pipe line, the ball 60 of the detent mechanism being in the notch 46 of the detent element 42 and the spring 64 being compressed to hold the mechanism in position to be actuated by the arrival of a pig. In this condition of the apparatus energy is stored in the spring 64 to be released upon tripping or triggering of the mechanism by a pig to actuate the signal and withdraw the element 32 from the flowway.

The element 32 may have only a very small area exposed to the flow of fluid through the pipe, so that there is no danger of accidental operation of the signal during normal flow of fluid therethrough.

Upon the arrival of a pig moving in either direction in the line the pig will engage the element 32 to initiate rotation of the shaft 22, which trips the mechanism by causing the ball 60 to ride out of the notch 46, whereupon the shaft will be rotated by the spring with a snapping action to a position to display the signal and remove element 32 from the line. It will be noted that very little force is required to move the element 32 to trip the mechanism, so that there is substantially no resistance imposed on the movement of the pig in the line. Moreover, when the signal has been operated the actuating element remains in a retracted position until reset.

It will be apparent that when the mechanism is set, as shown in FIGURE 6, energy is stored in the spring 64 which then becomes a source of energy from which energy is released by the triggering of the element 32 to actuate the signal and withdraw the element from the interior of the pipeline.

It will thus be seen that the invention, constructed and operated as described above provides pig detector mechanism for pipe lines which is of simple design and rugged construction, which is easily maintained in operating condition, and which is adapted for use as a visual indicator on the pipe line or for indicating at some remote location the arrival of a pig at a predetermined point.

The invention is disclosed herein in connection with particular embodiments of the same, which are intended by way of illustration only, it being understood that various changes can be made in the construction and arrangement of the parts within the spirit of the invention and the scope of the appended claims.

Having thus clearly shown and described the invention, what is claimed and desired to secure by Letters Patent is:

1. A device for signalling the arrival of a pipe line pig at a predetermined location in a pipe line having an opening at such location comprising a housing mounted on the pipe and having an opening in registration with the opening in the pipe, a lever element movably positioned in the housing for longitudinal movement to one position extending into the pipe through said openings and to another position out of the pipe, a rotatable member mounted in the housing and having a pivotal connection with said element for movement therewith, fulcrum forming means in the housing positioned for coaction with said element upon longitudinal movement of the element out of the pipe to rotate said member, said element being engageable with a pig in the pipe to move the element out of the pipe upon movement of the pig past said location, and means for indicating rotational movement of said member.

2. The signalling device as claimed in claim 1 including means for yieldingly resisting rotational movement of said member in response to movement of said element away from said one position.

3. The signalling device as claimed in claim 1 including means for causing rotational movement of said member with a snapping action in response to movement of said element away from said one position.

4. The signalling device as claimed in claim 1, wherein said member is movable to a predetermined position of rotation upon movement of said element to said one position and away from said predetermined position upon movement of the element out of the pipe in response to movement of the pig in either direction past said opening.

5. The signalling device as claimed in claim 4, including means for yieldingly resisting movement of said member from said predetermined position.

6. The signalling device as claimed in claim 4, including means for causing rotational movement of said member with a snapping action away from said predetermined position upon movement of said element out of said pipe.

7. The signalling device as claimed in claim 1, wherein said indicating means is disposed at a location remote from said pipe line.

8. The signalling device as claimed in claim 1, wherein said pipe line is located beneath the ground and said indicating means is located above ground.

References Cited

UNITED STATES PATENTS

| 1,597,668 | 8/1926 | Brier | 73—81 |
| 2,782,407 | 2/1957 | Ver Nooy | 116—124 |
| 2,960,961 | 11/1960 | Seger | 116—127 |
| 3,109,410 | 11/1963 | Ver Nooy | 116—124 |

FOREIGN PATENTS 974,014  11/1964  Great Britain.

LOUIS J. CAPOZI, *Primary Examiner.*